United States Patent [19]

Apps et al.

[11] Patent Number: 4,932,532
[45] Date of Patent: Jun. 12, 1990

[54] REUSABLE STACKABLE TRAY FOR CANS

[75] Inventors: William P. Apps, Anaheim; Arne Lang-Ree, Manhattan Beach, both of Calif.

[73] Assignee: Rehrig-Pacific Company, Inc., Los Angeles, Calif.

[21] Appl. No.: 272,039

[22] Filed: Nov. 15, 1988

[51] Int. Cl.⁵ .......................... B65D 21/02; B65D 1/24
[52] U.S. Cl. ..................... 206/503; 206/509; 206/427; 220/21; 220/66
[58] Field of Search ............... 220/21, 66; 206/427, 206/508, 509

[56] References Cited

U.S. PATENT DOCUMENTS

| | | |
|---|---|---|
| 3,009,579 | 11/1961 | Ettlinger, Jr. . |
| 3,155,268 | 11/1964 | Fogerty .................. 220/21 |
| 3,333,727 | 8/1967 | Belcher et al. . |
| 3,347,405 | 10/1967 | Motsenbocker ........... 220/21 |
| 3,349,943 | 10/1967 | Box . |
| 3,391,814 | 7/1968 | Box . |
| 3,391,815 | 7/1968 | Box . |
| 3,428,207 | 2/1969 | Schoeller ................. 220/21 |
| 3,517,852 | 6/1970 | Schoeller ................. 220/21 |
| 3,949,876 | 4/1976 | Bridges et al. . |
| 4,161,259 | 7/1979 | Palafox . |
| 4,249,671 | 2/1981 | Crolli .................... 220/21 |
| 4,700,837 | 10/1987 | Hammett . |
| 4,896,774 | 1/1990 | Hammett et al. . |

FOREIGN PATENT DOCUMENTS

| | | |
|---|---|---|
| 1152038 | 5/1969 | United Kingdom ........ 220/21 |
| 1182452 | 2/1970 | United Kingdom ........ 220/21 |

*Primary Examiner*—Geroge E. Lowrance
*Attorney, Agent, or Firm*—Banner, Birch, McKie & Beckett

[57] ABSTRACT

A reusable stackable tray for cans being formed by a rectangular wall structure, a web-like floor structure secured to and extending down from the wall structure and a plurality of spaced redoubt floor members spaced on and about and extending down from the bottom surface of the floor structure. Each of the redoubt floor members has a bevelled bottom edge perimeter such that a tray filled with cans can, without being lifted, be slidingly pulled and pivoted on the redoubt floor members directly on top of a layer of cans in another tray beneath it.

25 Claims, 7 Drawing Sheets

REUSABLE STACKABLE TRAY FOR CANS

BACKGROUND OF THE INVENTION

The present invention relates to trays for transporting and storing containers such as beverage containers, and more particularly for those storing two or more six-packs of pull-top aluminum cans. It further relates to such trays which can be securely stacked one on top of another both when full and when empty.

Pull-top aluminum cans for soft drinks, other beverages and the like are stored and transported during the distribution stage typically in short-walled cardboard trays or in cardboard boxes. On the other hand as to bottles, because of the ever increasing cost in disposable tertiary packaging, returnable, reusable containers are becoming popular for the storage and handling of bottles. However, unlike plastic or glass bottles which have rounded edges on their crown or top, pull-top aluminum cans have square sharp corners (as compared with bottle tops) where the top of the can attaches to the sides thereof. Therefore, particular difficulties have been encountered in the stacking and manipulating of the trays of cans stacked relative to one another. In fact, there are no known returnable, reusable trays suitable for supporting pull-top aluminum cans and which can, when filled with such cans, be stacked securely one on top of another, so that the top tray of a stack of filled trays can be easily pulled off and along the stack without being lifted. In other words, the trays should be constructed so that when loaded they can be easily pivoted and slid off of loaded trays beneath them without having to be lifted.

SUMMARY OF THE INVENTION

Accordingly, it is a principal object of the present invention to provide a returnable and reusable tray for storing and transporting cans.

It is a further object of the present invention to provide a returnable plastic tray adapted to accommodate and support therein twenty-four twelve ounce pull-top aluminum cans.

It is a still further object of the present invention to provide a returnable tray, particularly adapted for cans having square sharp top corners, which when full can be pulled and pivoted, without being lifted, on and along a top surface of another layer of such cans.

Another object of the present invention is to provide a novel, sturdy, reusable tray for storing and handling containers, and such tray having a webbed floor design which is interesting and aesthetically pleasing.

A further object of the present invention is to provide a sturdy reusable tray for supporting, storing and transporting beverage containers which tray is lightweight and thus can be easily manipulated and carried, and which can also be economically constructed.

Directed to achieving these objects, a unique stackable, reusable tray especially designed for stacking and storing cans having sharp top edges is provided herein. This stackable tray is formed by pairs of side walls and end walls integrally joined at their edges to define a rectangular structure. A floor structure is secured to and positioned generally within the rectangular structure. The floor structure is adapted for supporting thereon a plurality of cans positioned within the rectangular structure, and in a preferred embodiment is adapted to accommodate four six-packs (six containers in an interconnected two-by-three array) thereon. The floor structure is configured to define a web having a plurality of spaced, generally circularly-shaped members positioned in longitudinal and lateral rows. Redoubt members are spaced and positioned in the middle of these circularly-shaped members and are connected thereto and therebetween by a plurality of struts. The spaced redoubt members have the bottom surfaces thereof extending below the rest of the floor structure a slight distance. The redoubt members further have their bottom perimeters defining edges bevelled at an angle of approximately twenty-five degrees plus or minus five degrees relative to the rest of the floor structure. The bottom surfaces of the redoubt members thereby are configured so that a full tray can be easily slid and pivoted on the top of a layer of aluminum cans directly beneath it.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 8 is a cross-sectional view of a portion of the tray of FIG. 1 when loaded, locked and supported on a similar said loaded tray.

FIG. 9 is a view similar to that of FIG. 8 showing the trays thereof in a lock broken and sliding relation.

FIG. 10 is an enlarged cross-sectional view taken along line 10—10 in FIG. 3a.

DETAILED DESCRIPTION OF PREFERRED EMBODIMENTS OF THE INVENTION

Figure 7:
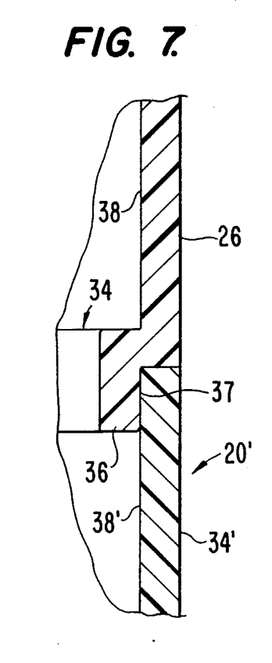
FIG. 7 is a fragmentary cross-sectional view of a side (or end) of a pair of empty trays of FIG. 1 showing their interlocking nesting arrangement.

Referring to the drawings a reusable, stackable tray for cans is illustrated generally at 20, and is formed by a unitary integral plastic construction. It comprises a pair of end walls 22, 24, and a pair of opposed side walls 26, 28 wherein the end and side walls are integrally joined to form four rounded corners as shown for example at 30. As seen, the end and side walls 22, 24, 26, 28 form a rectangular structure shown generally at 32. A floor structure designated generally by reference numeral 34 is positioned within and secured to the base of the rectangular structure 32. The perimeter structure 36 of the floor structure 34 has its outer surfaces 37 spaced inward about the entire perimeter thereof inside of the inside surface 38 of the rectangular structure 34 to thereby provide a stepped-in design. This allows one tray 20 to be stacked and nested securely, but removably, within another similar or identical empty tray 20' and thereby resist relative lateral movement as to the surface 38' of the rectangular structure 34'. This nesting relation is best illustrated in FIG. 7.

The floor structure 34, as seen in the drawings, defines a web-like construction which minimizes the use of the plastic material thereby making the tray 20 lighter and easier to handle and also reducing the amount of the plastic cnstruction material required. It further presents a pleasing and interesting design. The central dividing struts 42, 44 thereof extending, respectively, between the centers of the opposed side walls 26, 28 and the centers of the opposed end walls 22, 24 divide the floor structure 34 into four equal cells shown generally at 46, 48, 50 and 52, and aid in manufacturing by providing flow channels for the plastic material from the point of injection at the part center to the walls. Each cell then represents the storage space for an interconnected six-pack of beverage cans, and includes six spaced circular members such as shown by 54 in two-by-three arrays. Spaced redoubt members such as shown by 56 are positioned in the middle of four adjacent circular members 54. A plurality of struts such as shown generally at 58 then interconnects the circular members 54, the redoubt members 56, and the floor perimeter structure 36.

Figure 1:
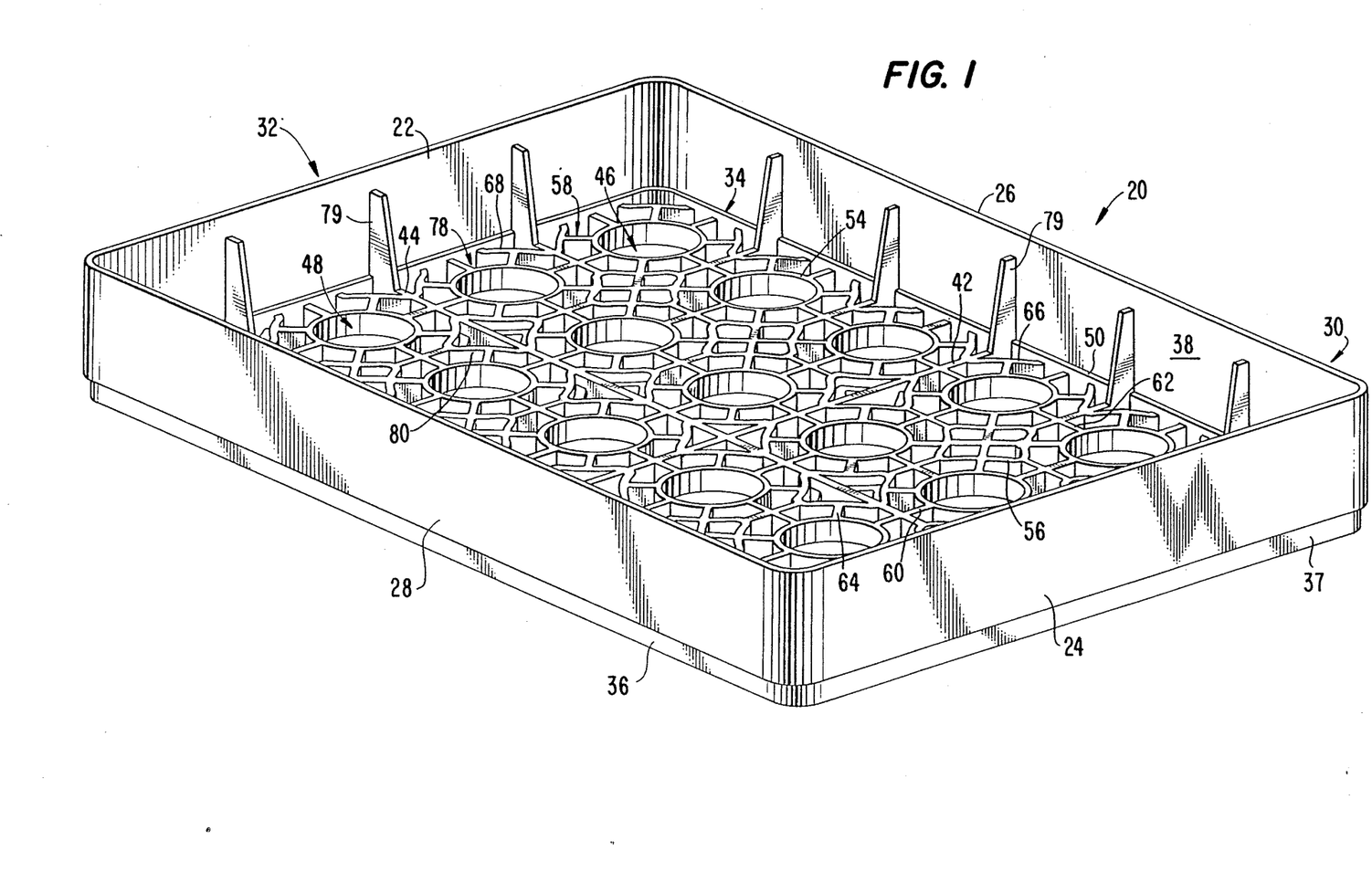
FIG. 1 is a top perspective view of a reusable stackable tray for cans of the present invention.
Figure 2:
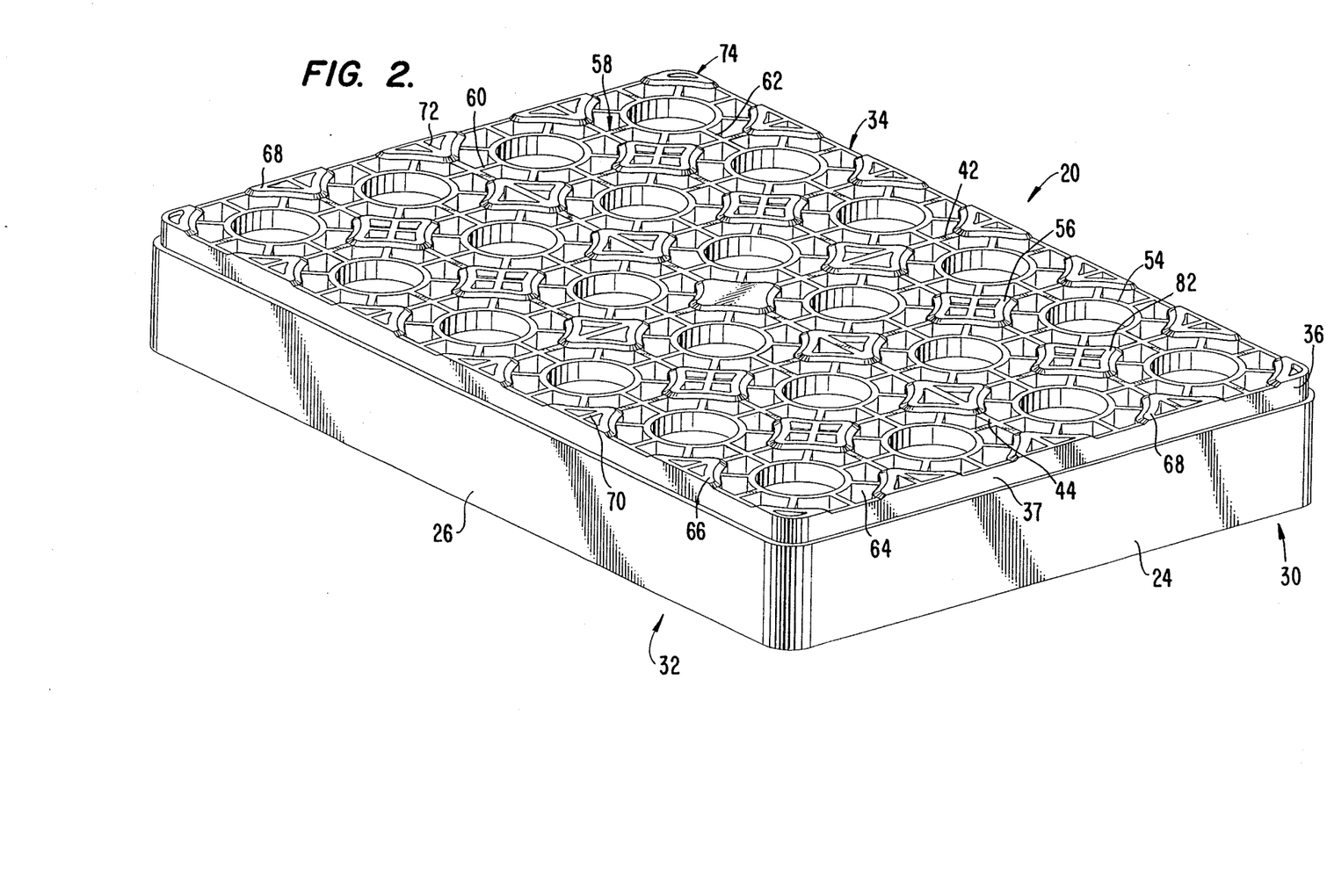
FIG. 2 is is a perspective view of the tray of FIG. 1 when upside down.
Figure 3A:
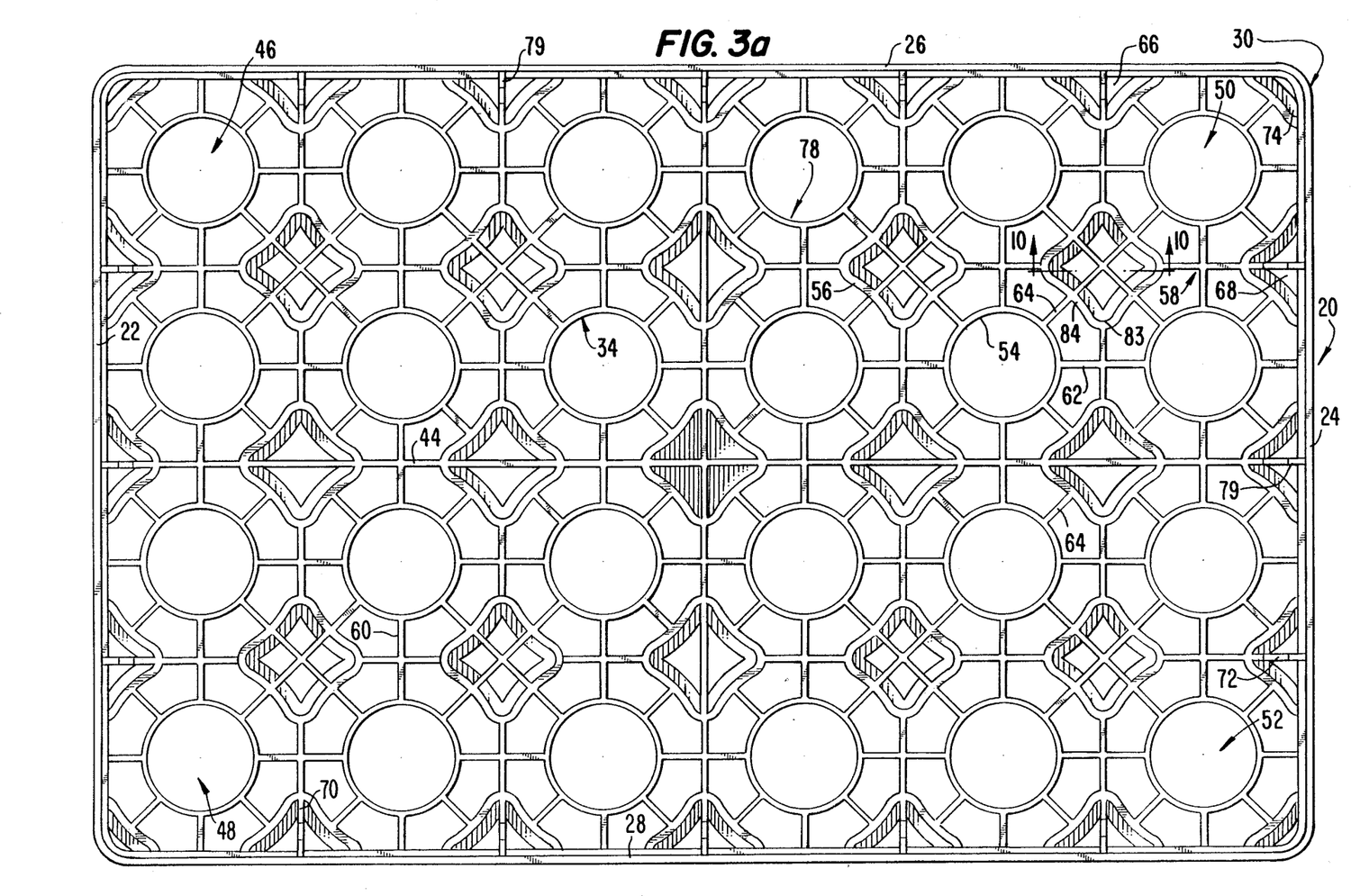
FIG. 3a is a top plan view of the tray of FIG. 1.
Figure 3B:
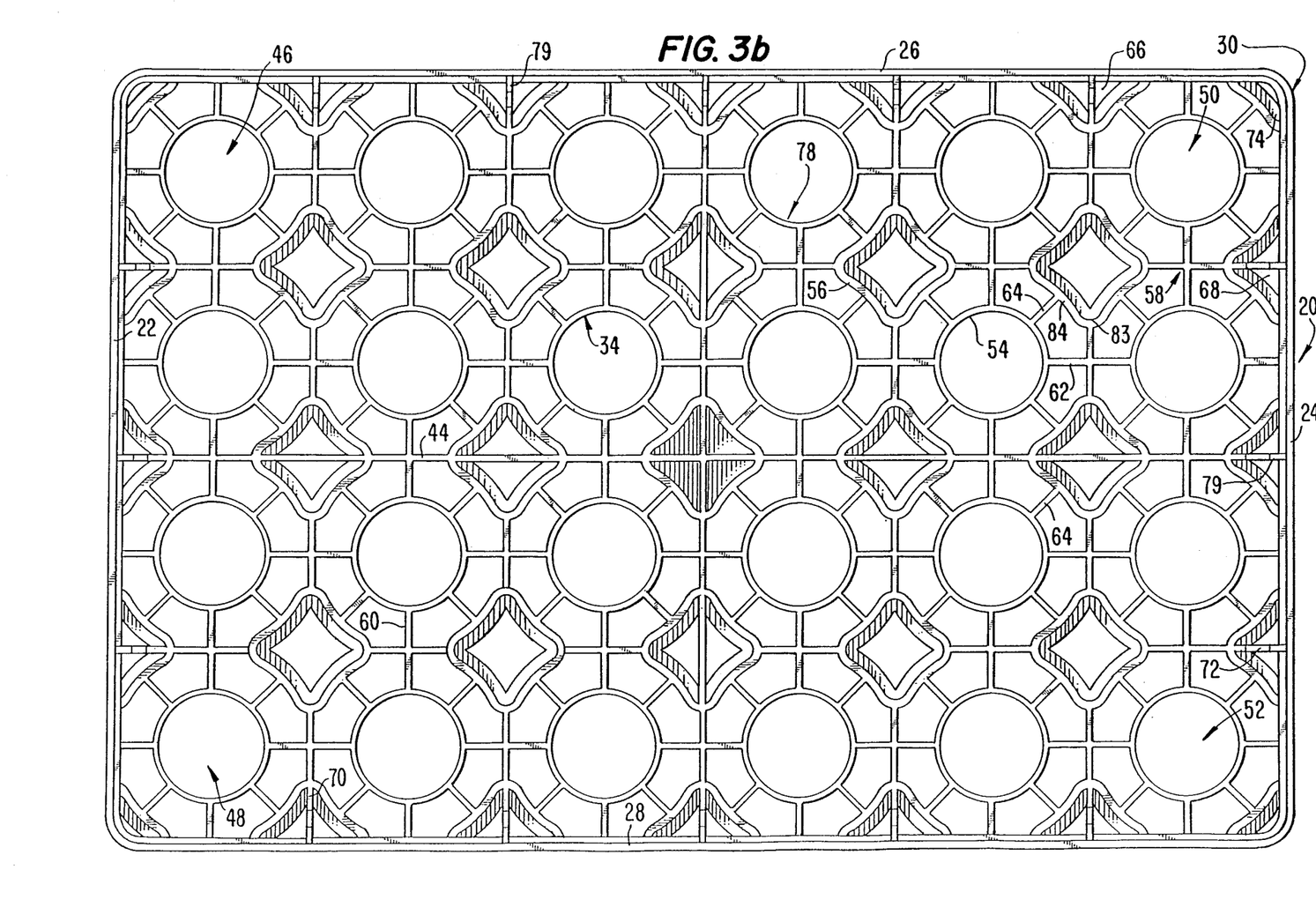
FIG. 3b is a view similar to that of FIG. 3a illustrating a variation on the design of the tray of FIG. 1.
Figure 4:
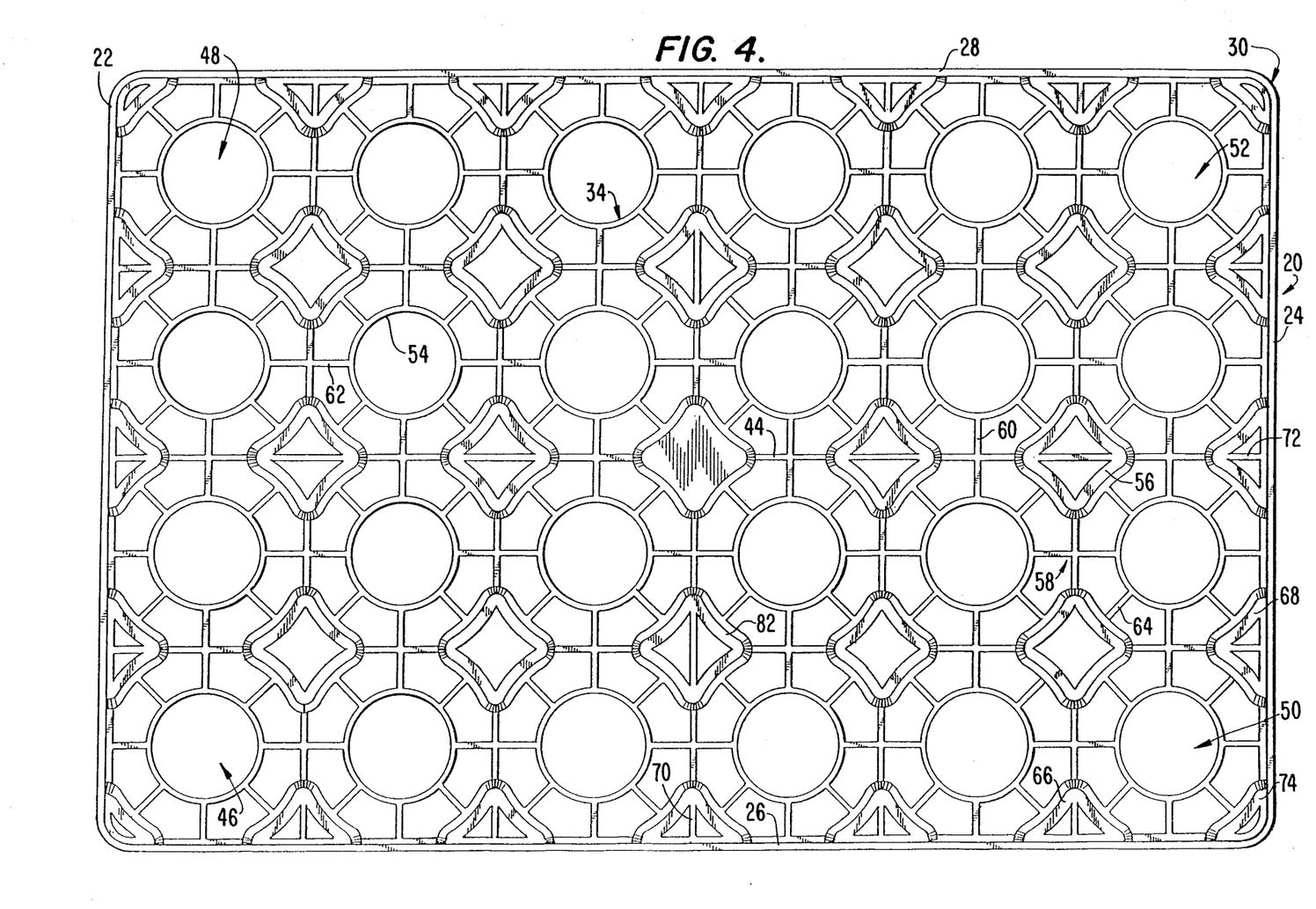
FIG. 4 is is a bottom plan view of the tray of FIG. 1.

The struts 58 comprise lateral struts such as shown by 60 which directly connect laterally adjacent circular members 54, longitudinal struts such as shown at 62 which directly connect longitudinally adjacent circular members 54, and radial struts such as shown at 64 which directly connect the sides of the redoubt members 56 to the circular members 54. For the redoubt members 56 positioned within the cells 46, 48, 50 or 52, radial struts 64 extend therethrough, as shown in FIG. 3a, for example. In another and perhaps more preferred design, the radial struts 64 do not extend through the redoubt members, as illustrated in FIG. 3b. Similarly, the dividing struts 42, 44 extend through the redoubt members 56 positioned between adjacent cells 46, 48, 50 or 52.

Figure 5:
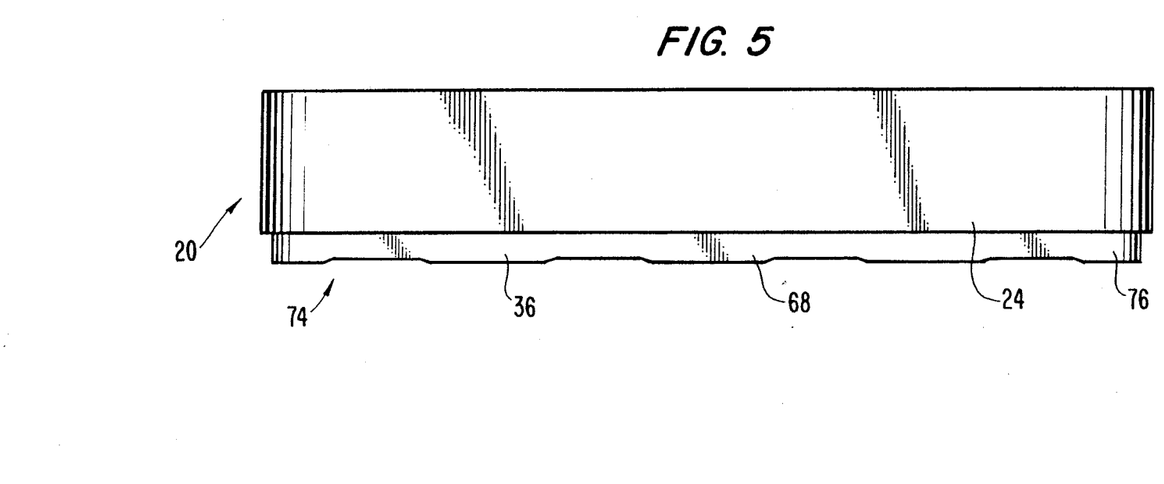
FIG. 5 is an end elevational view of the tray of FIG. 1.
Figure 6:
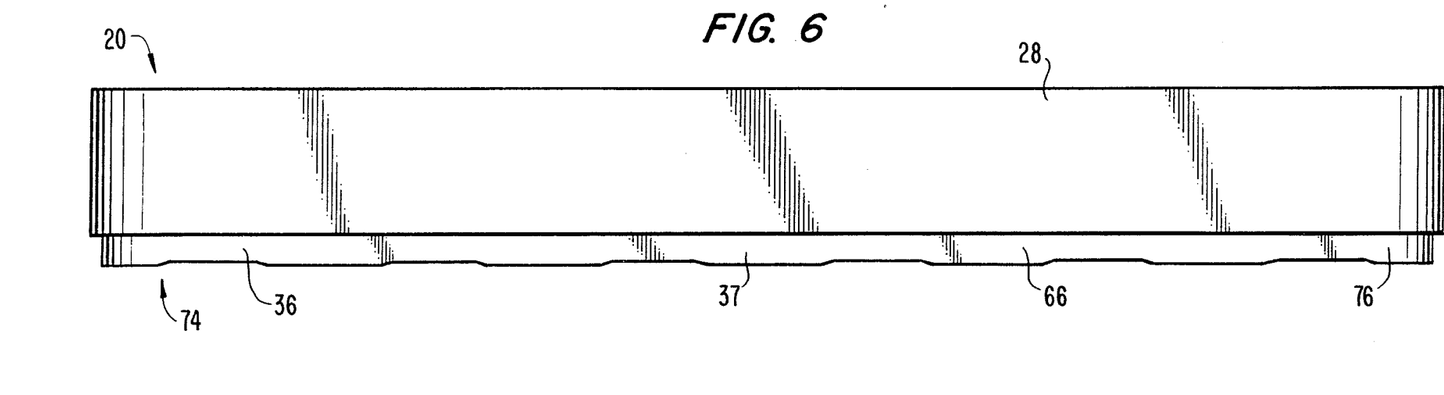
FIG. 6 is a side elevational view of the tray of FIG. 1.

Partial side and end engaging redoubt members such as shown at 66, 68, respectively, are positioned spaced along the floor perimeter structure 34, and are shown in elevation in FIGS. 5 and 6. These partial side and end engaging redoubt members 66, 68 have lateral or longitudinal redoubt struts 70, 72, respectively, extending through them as shown. Additionally, the corners such is shown at 74 of the floor perimeter structure 34 are rounded and have corner engaging redoubt members thereat such as shown at 76.

The tops of each of the struts 58, redoubt members 56, and circular members 54 all have their upper surfaces defining a smooth upper plane illustrated generally at 78 on which beverage cans can be positioned, supported and easily slid along without obstruction for inserting the cans into the tray 20 and removing them from it. A plurality of spaced reinforcing posts such as shown at 79, interconnect the floor structure 34 with the rectangular structure 32 by engaging the tops of adjacent lateral or longitudinal struts 60, 62 and extending up and secured to the inside surface 38 of the rectangular structure 32.

Figures 8, 9, 10:
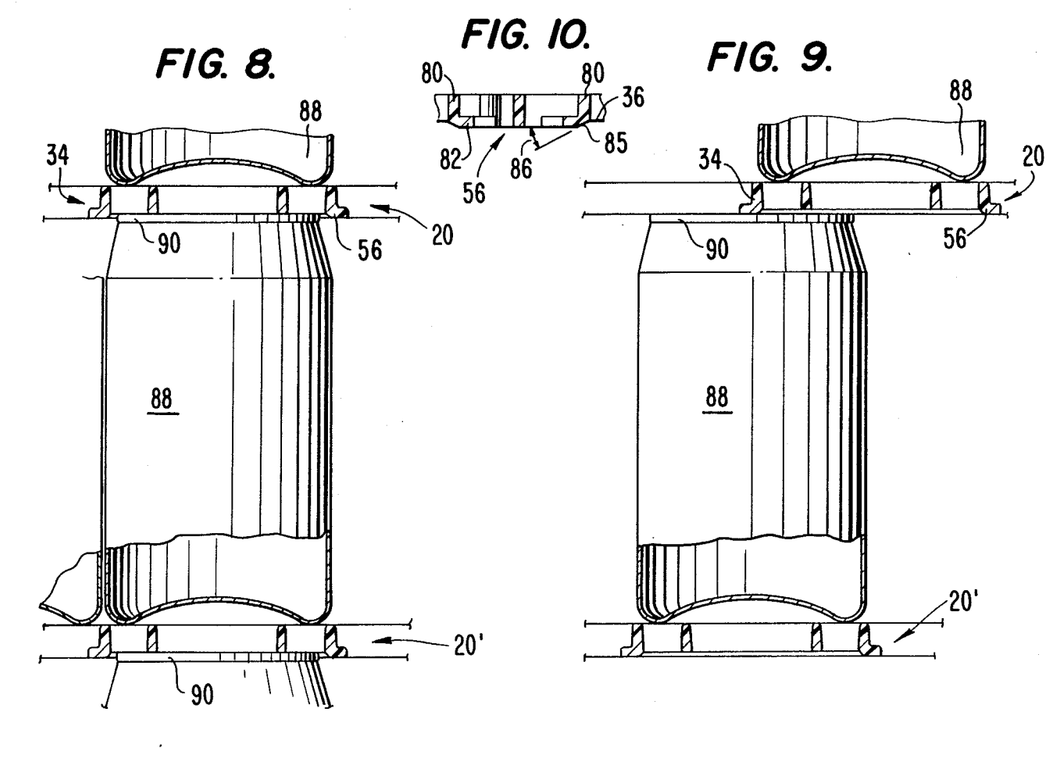

The redoubt members 56 are each formed by a continuous upright wall 80 and a redoubt floor 82 secured at the bottom end thereof, as best shown in FIG. 10. The redoubt walls 80 are configured in a square-like shape having rounded corners 83 and with the middles 84 of each of the sides thereof (where the radial struts 64 engage) being curved inwardly a slight amount. The bottom surfaces of the redoubt walls 81 lie generally in the plane of the bottom surfaces of the struts 58, the floor perimeter structure 36 and the circular members 54. The redoubt floor 82, however, extends below that plane. The redoubt floor 82 has about its entire bottom perimeter a bevelled edge 85 which is formed at an angle 86 of, for example, twenty-five degrees plus or minus five degrees relative to the bottom plane of the rest of the floor structure 36. This angle is appropriate for the current material and market can design. However, this angle would be adjusted as needed to accommodate different materials and can designs.

These small, permanent, spaced redoubt members 56 assist the trays 20 when full to stack securely upon layers of cans 88 beneath them, as shown in FIG. 8. The cans 88 are those such as described earlier herein and have square sharp top corners 90. They also allow the tray 20 to be twisted or pivoted slightly while stacked on a similar layer of cans 88 therebeneath and then slid easily off of the loaded tray beneath it. This motion is best illustrated in FIG. 9. This allows a delivery driver, for example, to pull off the top tray 20 of any tall stack without having to lift that top tray. In other words, a loaded tray 20 can be easily slid off the loaded tray directly beneath it. These redoubt members 56 are also spaced evenly relative to one another to conform to a twenty-four can configuration. It is also within the scope of this invention for tray 20 to be configured and proportioned differently as needed to accommodate different numbers, sizes and arrangements of containers.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. A stackable tray for cans comprising:
a pair of opposed side walls having bottom surfaces lying generally in a plane;
a pair of opposed end walls having end portions and bottom surfaces lying generally in a plane, said end walls being integrally joined at said end portions with said side walls to define a rectangular structure;
a floor structure secured to and positioned generally within said rectangular structure, said floor structure defining a support surface for a plurality of cans positioned within said rectangular structure, said floor structure comprising a plurality of spaced, generally circularly-shaped members, a plurality of redoubt members, and a strut means, said plurality of spaced, generally circularly-shaped members being positioned in longitudinal and lateral rows and defining the four corners of a plurality of parallelograms, said circularly-shaped members having bottom surfaces thereof lying generally in a plane, each of said redoubt members being spaced and positioned in the middle of a different one of said parallelograms, said redoubt members having bottom surfaces thereof lying generally in a plane, said strut means interconnecting said circularly-shaped members and said redoubt members, said strut means having bottom surfaces thereof lying generally in a plane, and said plane of said bottom surfaces of said redoubt members being spaced a distance below the lower of said planes of said circularly-shaped members and of said strut means; and each said redoubt member bottom surface having a bevelled edge about generally the entire perimeters thereof such that said floor structure when resting on a layer of cans therebeneath can be slidingly moved relative to a layer of cans on said bottom surfaces of said redoubt members and rotated relative to the layer of cans on said bevelled edges.

2. The tray of claim 1 wherein said strut means includes, for each of said parallelogram structures, a pair of longitudinal struts directly connecting longitudinally adjacent said circularly-shaped members and a pair of lateral struts directly connecting laterally adjacent said circularly-shaped members.

3. The tray of claim 2 wherein said strut means includes, for each of said parallelograms, radial struts directly connecting each of said corner circularly-shaped members to said redoubt member therein.

4. The tray of claim 1 wherein said strut means includes, for each of said parallelogram structures, diagonally-disposed radial struts directly connecting each of said corner circularly-shaped members to said redoubt member therein.

5. The tray of claim 1 wherein said strut means includes longitudinal and lateral redoubt struts directly connecting longitudinally and laterally adjacent said redoubt members, respectively.

6. The tray of claim 1 wherein said floor structure has a floor perimeter set in from and extending below outer surfaces of said side and end walls so that said floor structure can nest down and within the top of a corresponding said rectangular structure of another said stackable tray therebeneath.

7. The tray of claim 1 wherein said plane of said strut means corresponds to said plane of said circularly-shaped members.

8. The tray of claim 1 further comprising said floor structure having a bottom structure four-sided perimeter, and a plurality of side-engaging redoubt members engaging each side of said four-sided perimeter.

9. The tray of claim 8 wherein said four-sided perimeter passes through the center of each of said side-engaging redoubt members.

10. The tray of claim 8 further comprising said four-sided perimeter having four corners, and a corner-engaging redoubt member at each of said four corners of said four-sided perimeter.

11. The tray of claim 10 wherein said four-sided perimeter passes at generally right angles through each of said corner-engaging redoubt members.

12. The tray of claim 1 wherein said parallelogram is a rectangle.

13. The tray of claim 1 wherein said parallelogram is a square.

14. The tray of claim 1 wherein said bevelled edges define angles with respect to said plane of said bottom surfaces of said strut means of twenty-five degrees plus or minus five degrees.

15. The tray of claim 1 wherein said plurality of circularly-shaped members comprise twenty-four circular-shaped members arranged to define four three-by-two arrays so that said floor structure can accommodate thereon four six-packs of cans between and adjacent said end and side walls.

16. The tray of claim 1 wherein adjacent said parallelogram structures share a pair of adjacent circularly-shaped members therebetween.

17. The tray of claim 1 further comprising said end and side walls having wall inner surfaces, and a plurality of spaced posts secured directly to said wall inner surfaces and to said floor structure.

18. The tray of claim 17 wherein said posts are secured at the lower ends thereof directly to the tops of said strut means.

19. The tray of claim 1 wherein said rectangular structure has a lower edge, and said floor structure is secured along an edge thereof to said lower edge of said rectangular structure so that said floor structure extends below said rectangular structure.

20. The tray of claim 1 wherein said floor structure is integrally formed with said rectangular structure.

21. The tray of claim 1 further comprising said floor structure having a bottom structure four-sided perimeter, a plurality of side-engaging redoubt members engaging each side of said four-sided perimeter and having a bottom surface, a corner-engaging redoubt member at each of the four corners of said four-sided perimeter and having a bottom surface, said bottom surfaces of said side and corner-engaging redoubt members lying in the same plane as said bottom surfaces of said redoubt members, and said side and corner-engaging redoubt members having perimeter edges thereof directed inwardly relative to said floor structure being bevelled similar to said bevelled edges of said redoubt members.

22. The tray of claim 21 wherein said bevelled edges define angles with respect to said plane of said bottom surfaces of said strut means of twenty-five degrees plus or minus five degrees.

23. The tray of claim 1 wherein said redoubt members each define a square with four rounded corners and four sides connected to said corners and curving inwardly at the middles thereof.

24. The tray of claim 1 wherein each said redoubt member comprises a continuous upstanding wall having a bottom wall portion and a redoubt floor secured to said bottom wall portion, and said redoubt floors together define said redoubt bottom surfaces.

25. The tray of claim 24 wherein said redoubt floors have the top surfaces thereof lying generally in said plane of said bottom surfaces of said strut means.

* * * * *